(12) United States Patent
Nonaka

(10) Patent No.: US 6,351,607 B1
(45) Date of Patent: Feb. 26, 2002

(54) RANGING DEVICE

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/573,295

(22) Filed: May 18, 2000

(30) Foreign Application Priority Data

May 21, 1999 (JP) .......................................... 11-141549

(51) Int. Cl.$^7$ .............................................. G03B 13/36
(52) U.S. Cl. ....................................................... 396/106
(58) Field of Search ................................. 396/106, 115, 396/120; 356/3.04, 3.05, 3.06, 4.07, 3.08

(56) References Cited

U.S. PATENT DOCUMENTS 5,210,585 A * 5/1993 Suzuki .................... 396/106 X

FOREIGN PATENT DOCUMENTS

JP 05-011173 1/1993

* cited by examiner

*Primary Examiner*—W. B. Perkey
(74) *Attorney, Agent, or Firm*—Frishauf, Holtz, Goodman, Langer & Chick, P.C.

(57) ABSTRACT

The ranging device performs the active-type ranging, and has a structure in which a photo diode (PD) is provided on the far distance side of position sensitive detector (PSD), and superimposing means is provided for emphasizing a signal current $I_F$ flown from the far distance side electrode by superimposing a signal current obtained by the PD onto a signal current obtained by the PSD. As the superimposing means, an auxiliary PSD (the second PSD) is provided from a predetermined position directing from the near distance side to the far distance side of the original PSD (the first PSD) to the far distance side, and a signal obtained by the second PSD is superimposed on a signal output from the far distance side of the first PSD to emphasize it.

28 Claims, 8 Drawing Sheets

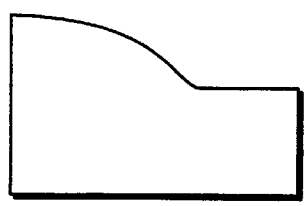
FIG. 6A
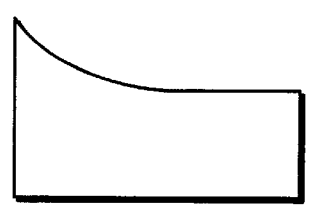
FIG. 6B
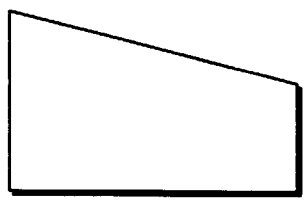
FIG. 6C
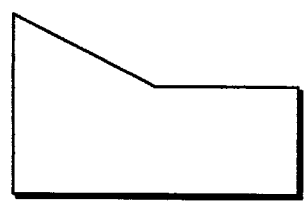
FIG. 6D
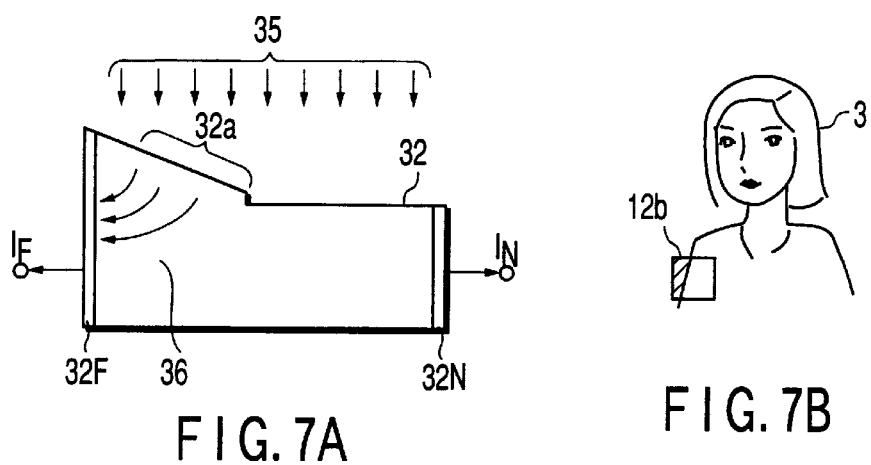
FIG. 7A
FIG. 7B
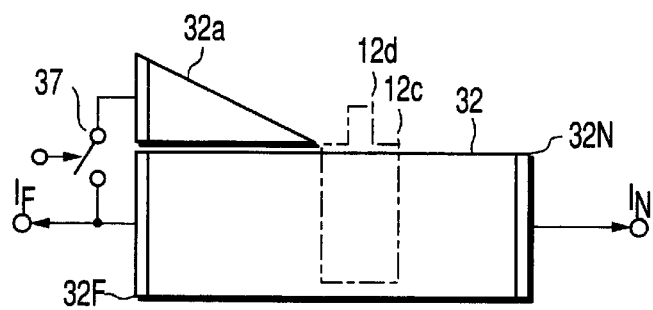
FIG. 8

RANGING DEVICE

CROSS-REFERENCE TO RELATED APPLICATIONS

This application is based upon and claims the benefit of priority from the prior Japanese Patent Application No. 11-141549, filed May 21, 1999, the entire contents of which are incorporated herein by reference.

BACKGROUND OF THE INVENTION

The present invention relates to an active auto-focus (AF) of a camera, performed by projecting ranging light onto an object to be photographed, and measuring the distance to the object by reflection light therefrom.

In general, as a ranging device used in a camera, a passive AF which utilizes an image signal of the object is known.

In order to perform ranging by the passive AF, a sensor array for obtaining an image signal of an object and a complicated circuit for carrying out an integration process on an output from the sensor array are required. Further, this technique entails a drawback of a low accuracy in the case where the object has a low brightness.

Under these circumstances, the active AF in which light is projected onto an object to be photographed, and measuring the distance to the object by receiving reflection light therefrom has become popular. The active AF has a simple structure and therefore is low cost, as compared to the passive AF. However, since its mechanism is based on the reflection light signal of the reflection light from the object, if the object is located at a far distance, the reflection light signal becomes low, causing deterioration of the accuracy.

A result (signal level) obtained by the active AF is based on the amount of reflection light. Because the amount of reflection light varies depending upon the reflection coefficient of the object, the result of ranging may differ from one case to another as follows. That is, a person dressed in black and a person dressed in white may have different ranging results even if they are standing at the same position.

In particular, as the position of the object is more remote in distance, the amount of reflection light received becomes low. Therefore, the influence of the reflection coefficient described above, and the influence of noise due to other type of light becomes relatively strong, thus making it impossible to perform accurate ranging. As a result, a photograph which was taken in such a situation becomes out of focus.

As a solution to the above-described drawback, Jpn. Pat. Appln. KOKAI Publication No. Hei 5-11173, for example, discloses a technique of ranging which can cover a near distance to a far distance, which is achieved by a position sensitive detector (PSD) for a near distance and a silicon photocell (SPC) for a far distance, used in place of a conventional position detecting means which receives reflection signal light and converts it photo-electrically. In this technique, the position sensitive detector and the silicon photocell are arranged in the same line which is in parallel to the direction of the base length of the taking lens, and the detection device is switched between the PSD and SPC depending upon the position of the object.

In the above-described Jpn. Pat. Appln. KOKAI Publication No. Hei 5-11173, two types of detectors for detecting the reflection light from an object to be photographed, are set side by side, and they are switched depending upon a situation where the position of the object is at a far distance or a near distance, so as to perform the ranging.

These detectors have different output characteristics (inclination), and therefore they operate on different processing methods in terms of the operation processing section where a control signal is generated to the taking lens. Further, at an instantaneous moment of switching the detector from one to another, the signal level input to the operator processing section is temporarily but drastically decreased or increased, and therefore such a switching moment cannot be obtained as a smooth linear variation.

Consequently, in a case where the object is situated at a very position of the distance where the detector is switched over, the signal level input to the operation processing section is greatly switched. In order to avoid this, there must be an addition circuit for carrying out switching before the signal level is input or carrying out the switching within the circuit itself, and thus a complicated process must be carried out within a short period of time.

Under these circumstances, the present invention proposes a ranging device operating on the basis of active AF capable of performing a high-accuracy ranging, which can be achieved with a simple structure and a low cost. In the present invention, the lowering of the accuracy of AF, caused by the decrease in the light amount of the reflection light from the object, is prevented, and the effect of canceling the reflection coefficient dependency, which can be achieved by the triangular ranging technique, is efficiently utilized, so as to obtain the result of the detection in a smooth way from a near distance to a far distance. Thus, the ranging can be performed regardless of the reflection coefficient of the object.

BRIEF SUMMARY OF THE INVENTION

The object of the present invention is to provide a ranging device operating on the basis of active AF capable of performing a high-accuracy ranging, which can be achieved with a simple structure and a low cost, by preventing the lowing of the accuracy of AF, caused by the decrease in the light amount of the reflection light from the object, and efficiently utilizing the effect of canceling the reflection coefficient dependency, which can be achieved by the triangular ranging technique, so as to obtain the result of the detection in a smooth way from a near distance to a far distance, thus making it possible to perform highly accurate ranging regardless of the reflection coefficient of the object.

In order to achieve the above-object of the present invention, there is provided a ranging device comprising: a light projecting portion for projecting ranging light to an object to be photographed; a light receiving portion for receiving reflection light of the ranging light from the object, and for outputting two signals for detecting an incident position thereof; and a superimposing portion for outputting a signal to be superimposed on one of the two output signals when the object is located at a further remote side than at a predetermined distance.

The light receiving portion includes the first position sensitive detector, the second position sensitive detector as the emphasizing means, directing from the far distance side of the position sensitive detector to the far distance side, and switching portion capable of connecting electrically the far distance side of the first position sensitive detector to the far distance side of the second position sensitive detector, and further an object brightness value calculating circuit for obtaining an object distance to the object in accordance with the output from the light receiving portion, and when the object brightness value calculating circuit judges that the object distance is a remote further than a predetermined distance, the switching portion is electrically connected so as to superimpose an output from the second position sensitive detector onto an output from the first position sensitive detector.

Further, the light receiving portion includes the position sensitive detector, the middle electrode as the emphasizing means, provided on the light receiving surface of the position sensitive detector, between the far distance side and the far distance side, and switch portion capable of connecting electrically the far distance side and the middle electrode, and the switch portion is electrically connected in accordance with the incident position of the reflection light received by the light receiving portion, so as to superimpose a signal obtained by the middle electrode onto a signal output from the far distance side.

In the ranging device having the above-described structure, the emphasizing means for emphasizing a signal of a far distance side, is provided, and thus a signal output from the far distance side electrode of the position sensitive detector is superimposed onto a signal obtained from the emphasizing means, thus increasing the level of the signal value of the far distance side electrode, and reduce the error of the ranging operation.

As the emphasizing means, an auxiliary position sensitive detector (the second position sensitive detector) is provided from a predetermined position directing from the near distance side to the far distance side of the original position sensitive detector (the first position sensitive detector) to the far distance side, and a signal obtained by the second position sensitive detector is superimposed on a signal output from the far distance side of the first position sensitive detector to emphasize it.

For the superimposing operation, switch portion made of a switch is provided between the far distance side of the second position sensitive detector and the far distance side of the first position sensitive detector. An output from the first position sensitive detector, or specifically, a signal obtained by the second position sensitive detector by switching the switch portion in accordance with the incident position of the reflection light of the first position sensitive detector, is superimposed onto a signal output from the far distance side of the first position sensitive detector.

As another emphasizing means, a middle electrode is disposed between the end portion of the near distance side and the far distance side on the light receiving surface of the position sensitive detector of the light receiving means, and switch portion made of a switch is provided between the far distance side and the middle electrode. An output from the first position sensitive detector, or specifically, a signal obtained by the middle electrode by switching the switch portion in accordance with the incident position of the reflection light of the first position detection element, is superimposed onto a signal output from the far distance side of the position sensitive detector.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 6A to 6D are diagrams illustrating another version of the position sensitive detector according to the third embodiment;

FIGS. 7A and 7B are diagrams illustrating the electrical operation in the position sensitive detector according to the third embodiment;

FIG. 8 is a diagram illustrating the structure of a position sensitive detector in the ranging device according to the fourth embodiment;

DETAILED DESCRIPTION OF THE INVENTION

Embodiments of the present invention will now be described with reference to accompanying drawings.

Figure 1A:
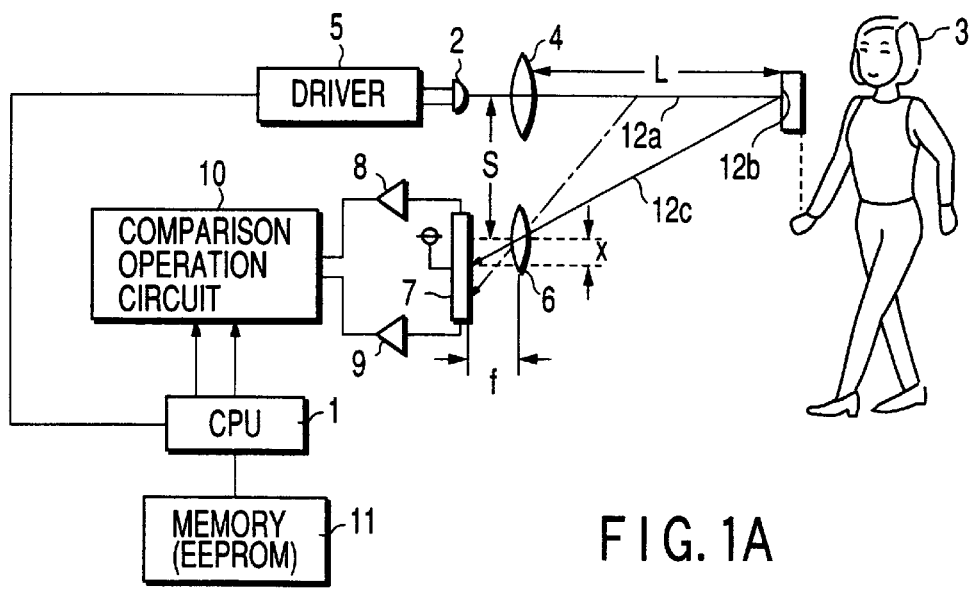
FIGS. 1A, 1B and 1C are diagrams showing the structure of a ranging device according to the present invention, designed to explain the concept of the ranging device.

First, in order to explain the ranging device of the present invention, a conceptual structure of a ranging device operating on an active-type triangular ranging method is shown in FIG. 1A, and it will be briefly described. Here, a case in which the invention is applied in a camera, will be discussed.

The ranging device having: a processing unit (CPU) 1 made of a one-chip microcomputer or the like, for carrying out operation control so as to control the sequence of the camera as a whole (not shown); an infrared light emitting diode (IRED) 2 for generating light for ranging; a light projecting lens 4 for converging the ranging light and projecting it onto an object 3 to be photographed; a driver 5 for driving the IRED 2; a light receiving lens 6 for converging reflection signal light from the object 3; a position sensitive detector (PSD) 7 for receiving the reflection signal light converted by the light receiving lens 6, so as to convert it photoelectrically; amplifiers 8 and 9 for amplifying signal currents (PSD outputs) output from the PSD 7; a comparison operation circuit 10 for comparing the PSD outputs thus amplified; and an electrically writable memory (EEPROM) 11 for storing an adjustment value for adjusting a difference which results from one camera to another due to a dispersion of types of the parts of each camera or dispersion which occurs during assembling operations.

With the above-described structure, the CPU 1 controls the driver 5 when carrying out ranging, so as to make the IRED 2 to emit light. The ranging light emitted is converged by the light projecting lens 4, and then projected as ranging light 12a onto the object 3, thus forming a signal light spot 12b on the object 3. The reflection signal light 12c from the object 3 is converged in a spot-like fashion on the light receiving lens 6, and then is made to fall on the light receiving surface of the PSD 7.

Figure 1B:
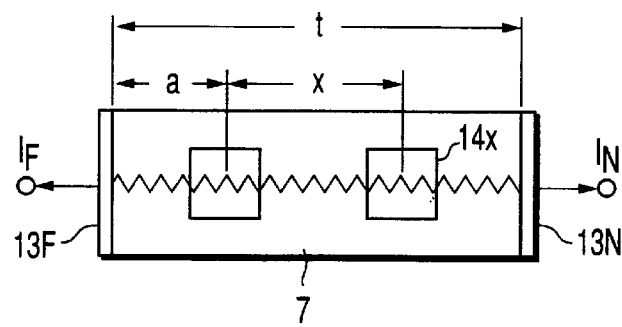

FIG. 1B is a diagram showing conceptually the light receiving surface of the PSD 7. Here, in accordance with the incident portion 14x and intensity of reflection signal light 12c made incident on the light receiving surface, two signal currents $I_N$ and $I_F$ are output from two electrodes 13N and 13F.

In the PSD 7, a resistance layer 13 is formed such as to have a uniform resistance value, on a photo-electric conversion element (light receiving surface). For example, when the reflection signal light 12c is made incident on the position 14x, the photo current $I_P$ created on the basis of the incident position 14x is divided into the two signal currents $I_N$ and $I_F$ in accordance with the resistance values taken to the respective electrodes, due to the current distribution effect of the resistance layer.

For example when the length of the light receiving surface of the PSD 7 is t, and the resistance value is r and constant anywhere, the resistance value $r_F$ from the incident position to the electrode 13F and the resistance value $r_N$ from the incident position 14x to the electrode 13N are obtained by (a+x):(t−(a+x)). Therefore, the currents output from the electrodes satisfy the relationship:

$$I_N = \frac{a+x}{t} I_P, \quad I_N + I_F = I_P$$

Therefore, the following result can be obtained.

$$\frac{I_N}{I_N + I_F} = \frac{a+x}{t}$$

That is, by calculating the ratio between the signal current $I_N$ and signal currents $I_F$, the light incident position a+x can be obtained.

The position a indicates an imaginary spot barycentric position when a spot is made incident from an object located at a distance corresponding to ∞, and it is a fixed value. The position x is a variable used in a triangular ranging operation, and as is clear from FIG. 1A, L:S=f:x.

The symbol S is called basic length, and indicates a distance between principal points of lenses. Since these values are fixed values, and therefore the distance to the object, that is, L can be obtained from L=S·f/x. It should be noted here that the running amount of the taking lens is proportional to 1/L, and therefore it suffices if the CPU 1 calculates x/S·f. From the equation above, this x value can be obtained by the following manner.

$$x = t \times \frac{I_N}{I_N + I_F} - a$$

Figure 1C:
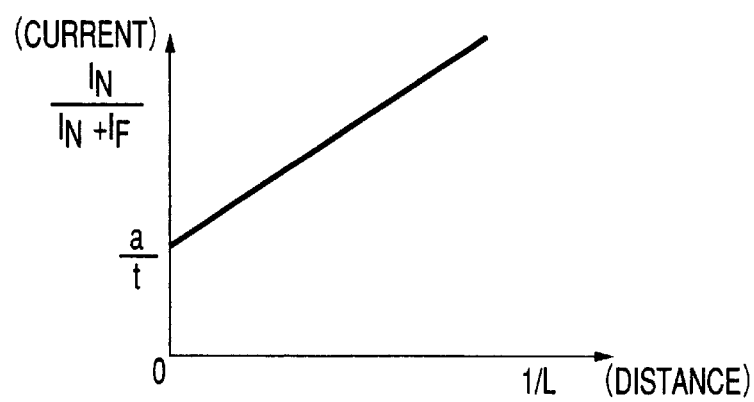

Therefore, when x=0 (that is, L=∞), $I_N/(I_N+I_F)$ becomes a/t, and 1/L and $I_N/(I_N+I_F)$ vary in the relationship indicated in FIG. 1C.

In practice, in the ranging device shown in FIG. 1A, signal currents ($I_N$, $I_F$), which are outputs from the PSD 7, are amplified by the amplifiers 8 and 9, and then input to the comparison operation circuit 10, where they are subjected to comparison operation. Then, in accordance with thus obtained $I_N/(I_N+I_F)$, the CPU 1 can obtain the above-mentioned 1/L value, thus making it possible to control a focusing operation.

However, the most serious drawback of the active AF is, as mentioned before, that the reflection light 12c attenuates in a remote-distance ranging operation when an object is situated at a far distance, thereby causing the deterioration of the accuracy. This occurs due to the following mechanism. That is, signal currents $I_N$ and $I_F$ each become small, and as noise is mixed into these reduced currents, the influence of the noise becomes excessively significant in term of relativity. As a result, the calculation of the ratio described above cannot be appropriately performed, thus creating the drawback. That is, as the denominator and numerator of the formula become close to "0", the influence of the noise becomes more and more serious, thus erroneous values can be easily created.

In the conventional technique, in the case where obtained signal currents ($I_N$, $I_F$) become small, such results are not used, but a predetermined remote-distance data is output, as a solution to the drawback.

By contrast, in the present invention, as the relationship $I_N/(I_N+I_F)$ is emphasized on the remote-distance side, an attention is paid to the signal current $I_F$ which is contained only in the denominator. More specifically, when the distance becomes further than a predetermined value, the signal current $I_F$ is increased, that is, the signal current obtained from the electrode 13F side of the PSD 7 is linearly increased.

Next, the ranging device according to the first embodiment of the present invention will now be described.

This embodiment is different from the before-described device in terms of the position sensitive detector shown in FIG. 1B.

Figure 2A:
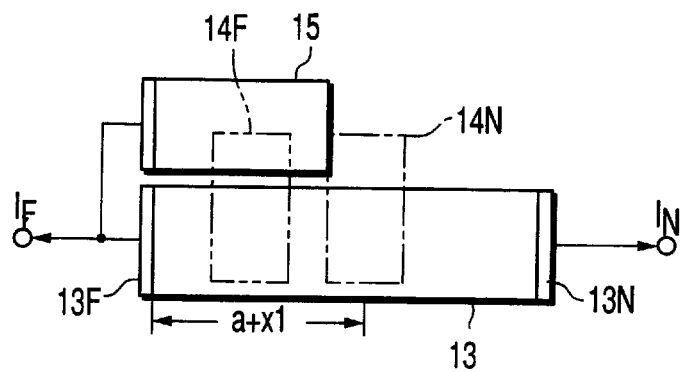
FIGS. 2A and 2B are diagrams illustrating the structure of a position sensitive detector and its output characteristics in the ranging device according to the first embodiment.

FIG. 2A shows the structure of the position sensitive detector of this embodiment.

With this structure, a photo diode (PD) 15 is provided at a side of the PSD 7 such that part of reflection signal light 12c which is converged by an optical lens 6 and made incident as spot light, is made to fall thereon.

A signal current thus obtained by the PD 15 is added to a signal current obtained by the PSD 7. More specifically, up to the position indicated by 14N in the figure, a signal current can be obtained as in the case of the conventional ranging operation from the reflection light 12c made incident as spot light; however if it becomes further in distance, part of the spot light falls on the PD 15 as indicated by 14F, and the signal current $I_F$ flow out of the electrode 13F is emphasized with the light current $I_{F0}$ obtained from the part of the light.

As a result, the calculation of $I_N/(I_N+I_F+I_{F0})$ is carried out in the comparison operation circuit 10.

Figure 2B:
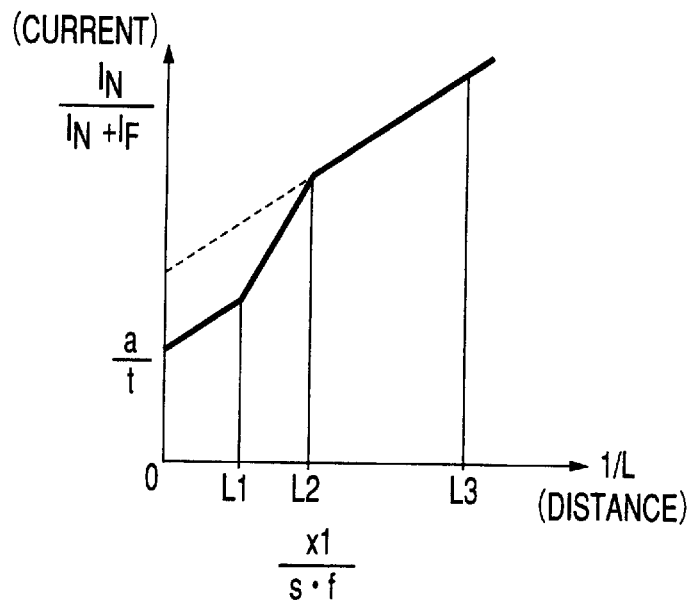

As the spot of the reflection light 12c falls more on the PD 15, the more signal current is output, and thus the signal current $I_{F0}$ exhibits an emphasizing effect. Therefore, a ranging result of a relationship such as shown in FIG. 2B can be obtained.

More specifically, in a region from the position 14N to the electrode 13F, where the reduction of the signal current obtained in a remote-distance ranging operation is decreased, the inclination of the graph is made to rise in a linear manner. That is, the distance resolution is further enhanced to compensate the drawback of the conventional active AF. Further, unlike the before-mentioned document (Jpn. Pat. Appln. KOKAI Publication No. 5-11173), in the present invention, two detectors having totally different output characteristics, which are switched over one another, are not used, and therefore a switching circuit or the like is not necessary.

It should be noted here that beyond the position 14F (that is, L2 of FIG. 2B), the spot of the reflection light 12c is made to completely fall on the PD 15, and therefore such an emphasizing effect cannot be obtained any further. However, at such a position that is far distance, it would make no different from the conventional technique in terms of the judgment of light amount which is not emphasized, in photographing.

Figure 3:
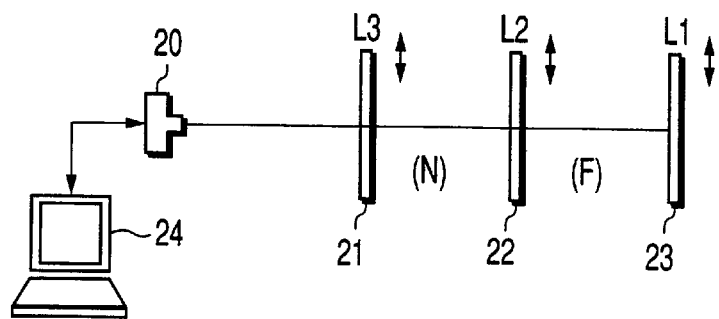
FIG. 3 is a diagram illustrating the adjustment method of the ranging device according to the first embodiment.

As to the camera 20, there is usually some dispersion of quality among cameras due to parts and assembling operation. In the practice of this embodiment, while the assembly of the camera, charts are disposed before and after each of two transition points indicated in FIG. 2B, as shown in FIG. 3, and these charts are ranged one after another, for the adjustment of the dispersion. Thus, it is here necessary to adjust the inclination error in characteristics. The adjustment values obtained here are stored in the memory 11.

The adjustment shown in FIG. 3 is done by connecting the camera 20 to an adjustment personal computer 24 in order to write data in the memory 11 of the camera.

Here, the charts 21 and 22 are disposed to be movable, in front of the camera 20, and they are moved away from the camera 20 on the optical path, and the distances to the charts are measured by the camera 20 one after another.

From the distance data thus obtained, the inclination coefficient is obtained by the adjustment personal computer 24, and written in the memory 11.

The camera 20 which stores the data, refers to the memory contents in the memory 11 each time a photograph is taken, so as to calculate the ranging result. Thus, accurate focusing can be performed.

As described above, according to this embodiment, as the object is located at a more remote position within a limitation necessary for the ranging, the signal obtained from the remote-side detector is more emphasized. With this operation, an active AF operation which can perform an accurate far distance ranging can be achieved.

The degree of such emphasis is determined not simply by the amount of light, but by the positions of the spot 12b and the PD 15 with relative to each other, and therefore the ranging result with less influence of the reflection coefficient of the object can be obtained as in the case of the triangular ranging.

Figure 4A:
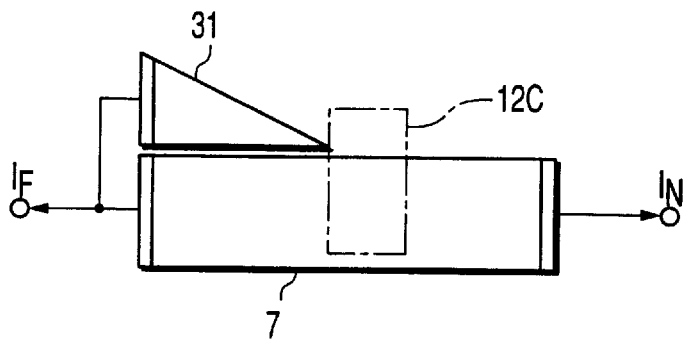
FIGS. 4A and 4B are diagrams illustrating the structure of a position sensitive detector and its output characteristics in the ranging device according to the second embodiment.
Figure 4B:
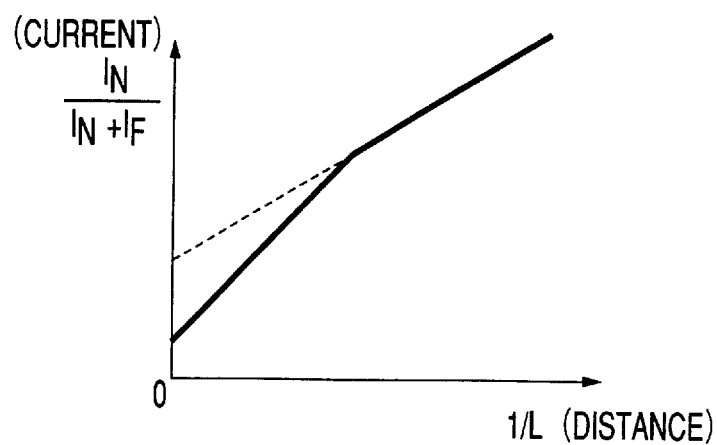

FIGS. 4A and 4B show the conceptual structure of a position sensitive detector in a ranging device according to the second embodiment, which will now be described.

In the first embodiment discussed above, beyond the region F indicated in FIG. 2B, which illustrates the characteristics of the PSD 7 and PD 15, the emphasizing effect is not longer obtained. This embodiment is an improved version of the first embodiment as described below.

That is, as shown in FIG. 4A, a PD 31 disposed adjacent to a PSD 7 is formed in a triangle shape. With the triangle shape of the PD 31, even if the spot 12c moves to a far distance side, its variation does not stop and becomes larger as it moves, as can be understood from the ranging characteristics shown in FIG. 4B. Therefore, the emphasizing effect on the far distance side can be expected in a wider range.

Figure 5:
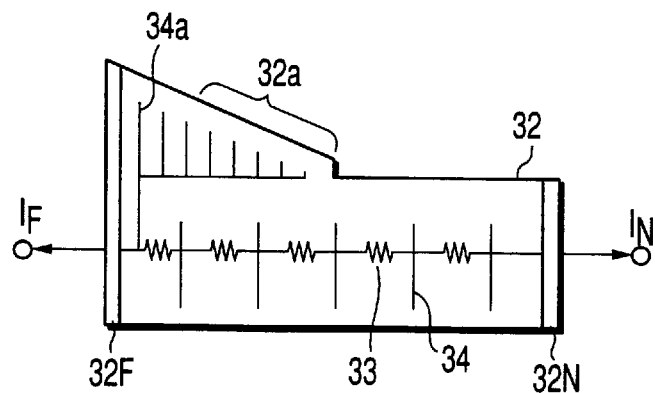
FIG. 5 is a diagram illustrating the structure of a position sensitive detector in the ranging device according to the third embodiment.

FIG. 5 shows the conceptual structure of a position sensitive detector in a ranging device according to the third embodiment, which will now be described.

The position sensitive detector of this embodiment is not constituted by a PSD 7 and PD 1 separately provided as in the previous embodiments, but it consists of a PSD only.

In the PSD 32, a resistance layer which combines a near distance-side electrode 32N and a far distance side electrode 32F, and a plurality of conductive layers 34 for guiding a photo current to the resistance layer 33 at high efficiency, are provided.

Further, a projection portion 32a is formed on an extended portion of a light receiving surface as of the PSD 32, and a conductive layer 34a is provided on the projection portion 32a. The light made incident on the projection portion 32a flows as photo current into the conductive line 34a, and it guided to the far distance side electrode 32F.

With the above-described structure, a similar advantage to that of the second embodiment can be obtained without having to provide a PD separately to the PSD.

FIGS. 6A to 6D each illustrate a different version of the position sensitive detector of the third embodiment. Each of these detectors is made of a PSD 32 only as in the third embodiment, and they each have projections of different shapes for an electrode of the far distance side.

FIG. 7A shows the conceptual structure of the position sensitive detector in a ranging device according to the fourth embodiment, which will now be described.

In the position sensitive detector (PSD+PD, PSD) of each of the first to third embodiments described above, a photo current is supplied to the electrode of the far distance side only.

As in this case, where a photo current is supplied to one of the electrodes, for example, if noise light 35 falls uniformly on the PSD 32 (taking the PSD 32 as an example) as can be seen FIG. 7A, a noise photo current 36 is generated from a projection portion 32a, which deteriorates the S/N ratio only that one of the electrodes 32F. As a result, an accurate ranging operation cannot be performed.

In order to avoid this, the PSD 32 and the projection portion 32a are separated electrically from each other, and both electrodes are connected via a switch 37.

Further, as shown in FIG. 7B, if ranging light 12b is not projected property onto the object 3, and part of the spot is cut out, the ranging result becomes inaccurate. Therefore, an extrusion portion 12d in the shape of the ranging spot is made close to its center, where the cut-out of the spot does not easily occur. However, in this case, there are two modes created by ON/OFF of the switch 37, and therefore it may require two ranging operations to be performed depending on a situation.

That is, in the case where the object is situated at a near distance, it is not necessary to emphasize the ranging signal on the far distance side, and in a case of a high brightness having a lot of noise, it is possible that the accuracy is deteriorated on the contrary. Therefore, only the ranging with the switch 37 being turned off is carried out. However, in the case where the far distance side is measured by a photographing scene having less noise, for example, as shown in FIG. 1, the CPU 1 carries out a port control, so as to thus turn on the switch 37. In this manner, the mode is shifted to emphasize the ranging signal for the far distance side, and thus the ranging (that is, to perform a comparison operation with respect to IRED light emission) is carried out.

Figure 9:
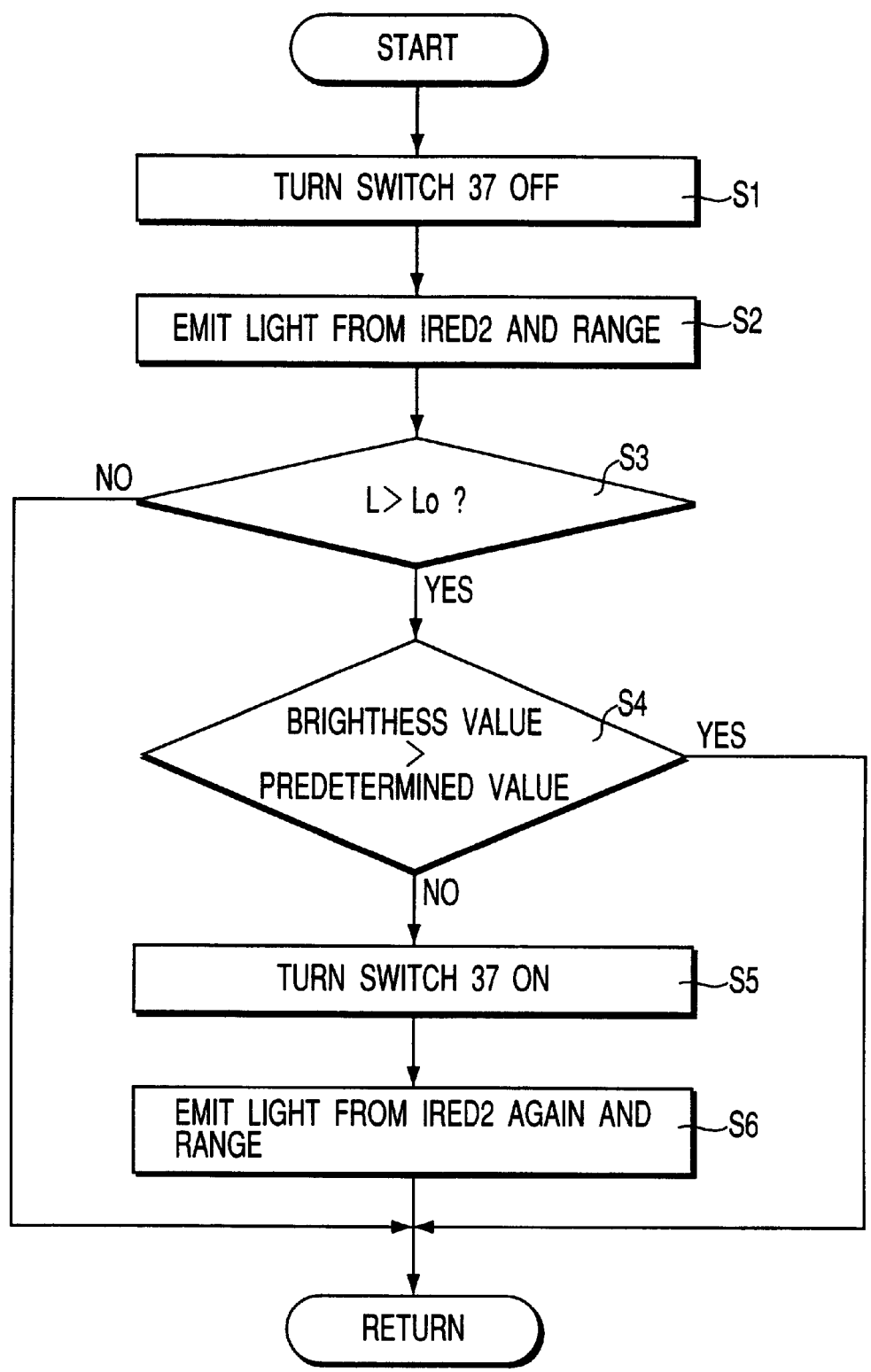
FIG. 9 is a flowchart illustrating the operation of the position sensitive detector according to the fourth embodiment.

Here, as illustrated by the flowchart of FIG. 9, first, the switch 37 is turned off (step S1), and then ranging with light emission of the IRED 2 is carried out (step S2). The thus obtained result L of the ranging and a preset value $L_0$ obtained in consideration of light noise are compared with each other (step S3). If the ranging result L is larger than and the preset value $L_0$ (that is, YES), it is possible that the object is situated at a far distance, and therefore the brightness degree is judged. In other words, it is judged whether or not the obtained brightness value is larger than the preset value (step S4). If the result of the judgment indicates that the brightness value is larger than the preset value (that is, YES), the object is judged to be located at a near distance, and the ranging is finished.

In contrast, if the brightness value is smaller than the preset value (that is, NO), the object is judged to be located at far distance. Thus, the switch 37 is turned on (step S5), and the ranging is carried out once again (step S6). It should be noted here that if the judgment made in the step S3 indicates that the ranging result L is smaller than the preset value Lo (that is, NO), the object is judged to be located at a far distance, and the ranging is finished.

With this embodiment, the adverse effect of the deterioration of the S/N ratio by the PD, which arises in the optical position detection element having a structure in which separate light receiving elements are arranged side by side, which is employed in the first and second embodiments, can be avoided. In this embodiment, they are electrically separated from each other and the PSD and PD provided adjacent thereto are connected via a switch to each other, so as to become able to carry out ranging while switching over a near distance to far distance, or vice versa. In this manner, the noise light can be removed.

Further, with the shape and arrangement in which the projection is placed at the center, the adverse effect does not easily occur, even if some cut-out section is created in the ranging light irradiated on the object. Thus, it becomes possible to provide an active AF camera capable of ranging up to a far distance, thereby having less out-of-focus results.

FIGS. 10A to 10E show the conceptual structure of the position sensitive detector in a ranging device according to the fifth embodiment, which will now be described.

In the position sensitive detector of this embodiment, a third electrode 13M is provided at a middle between two on both sides of the PSD 13, that is, a near distance side electrode 13N and a far distance side electrode 13F. Further, a switch 38 is provided to connect the middle electrode 13M and the electrode 13.

It is designed that the middle electrode 13M has such a structure that the ranging light, namely, reflection spot 39 of reflection signal light, passes over the electrode 13M and irradiated on both of the light receiving surfaces 40 and 41 of the PSD 13.

With this structure, when the switch 38 is turned off, and a reflection spot of the reflection signal light 12c is made incident on the light receiving surfaces of the PSD 13, signal currents $I_N$ and $I_F$ are obtained from the electrodes 13N and 13F, respectively.

Next, if the switch 38 is turned on when the reflection spot moving from the electrode 13N side passes over the electrode 13M and enters the electrode 13F side, a current does not substantially flow in the electrode 13N, but a signal current $I_F$, as a total of a current flowing to the electrode 13F from the light receiving surfaces, and a current flowing to the electrode 13F via the switch 38 from the electrode 13M, is output from the electrode 13F.

That is, the entire current resulting from the spot portion which enters between the two electrodes 13F and 13M, flows towards the current terminal of the electrode 13F.

For example, let us suppose that when the center of the electrode 13M and the center of the reflection spot matches in position, and the switch 38 is turned off, the signal currents $I_N$ and $I_F$ output from the electrodes 13F and 13N have a ratio of 1:1.

Then, when the switch 38 is turned on, the entire current of the shadowed section 12F flows to the current terminal of the electrode 13F, and in addition, the current of the spot section (that is, 12N in FIG. 10C) remaining between the electrodes 13M and 13N, is divided in accordance with the distances to the electrode 13M and 13N. For this reason, an increment amount a is added. Therefore, as compared to the time when the switch 38 is off, that is, $$\frac{I_N}{I_N + I_F} = \frac{1}{2} = 0.5$$

$$\frac{1 - 0.5 - \alpha}{1} = 0.5 - \alpha$$

the far distance signal is emphasized by an amount of α.

Let us take an example case where the light receiving position of the reflection spot S moves by 0.1 mm, and the length of the PSD is 2 mm. In this case, the output varies by only 5%. As compared to this, in another case where the width W of the reflection spot is 0.4 mm, before the movement, the status shown in FIG. 10C was expressed by 0.2+0.1:0.1, whereas after the movement, it becomes 0.3+0.05:0.05. Therefore, in the comparison operation, 0.1/0.4=0.25 is shifted to 0.05/0.4=0.125. Therefore, a variation of 20% is emphasized.

Figure 10A:
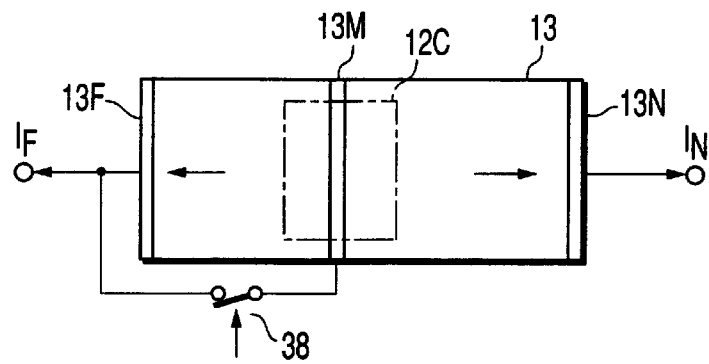
FIGS. 10A to 10E are diagrams illustrating the structure of a position sensitive detector in the ranging device according to the fifth embodiment.
Figure 10B:
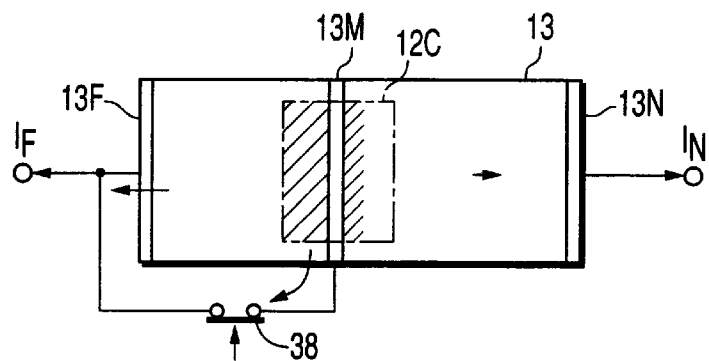
Figure 10C:
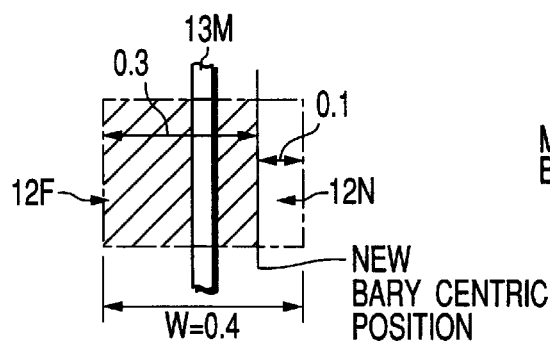
Figure 10D:
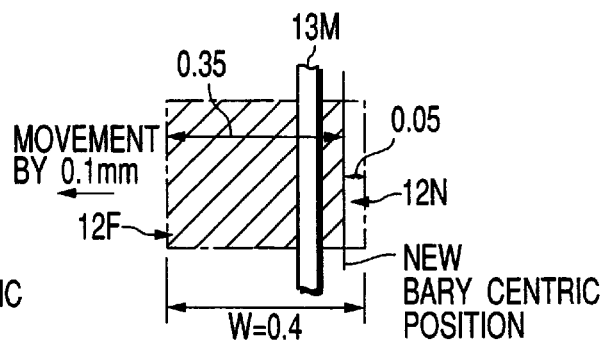
Figure 10E:
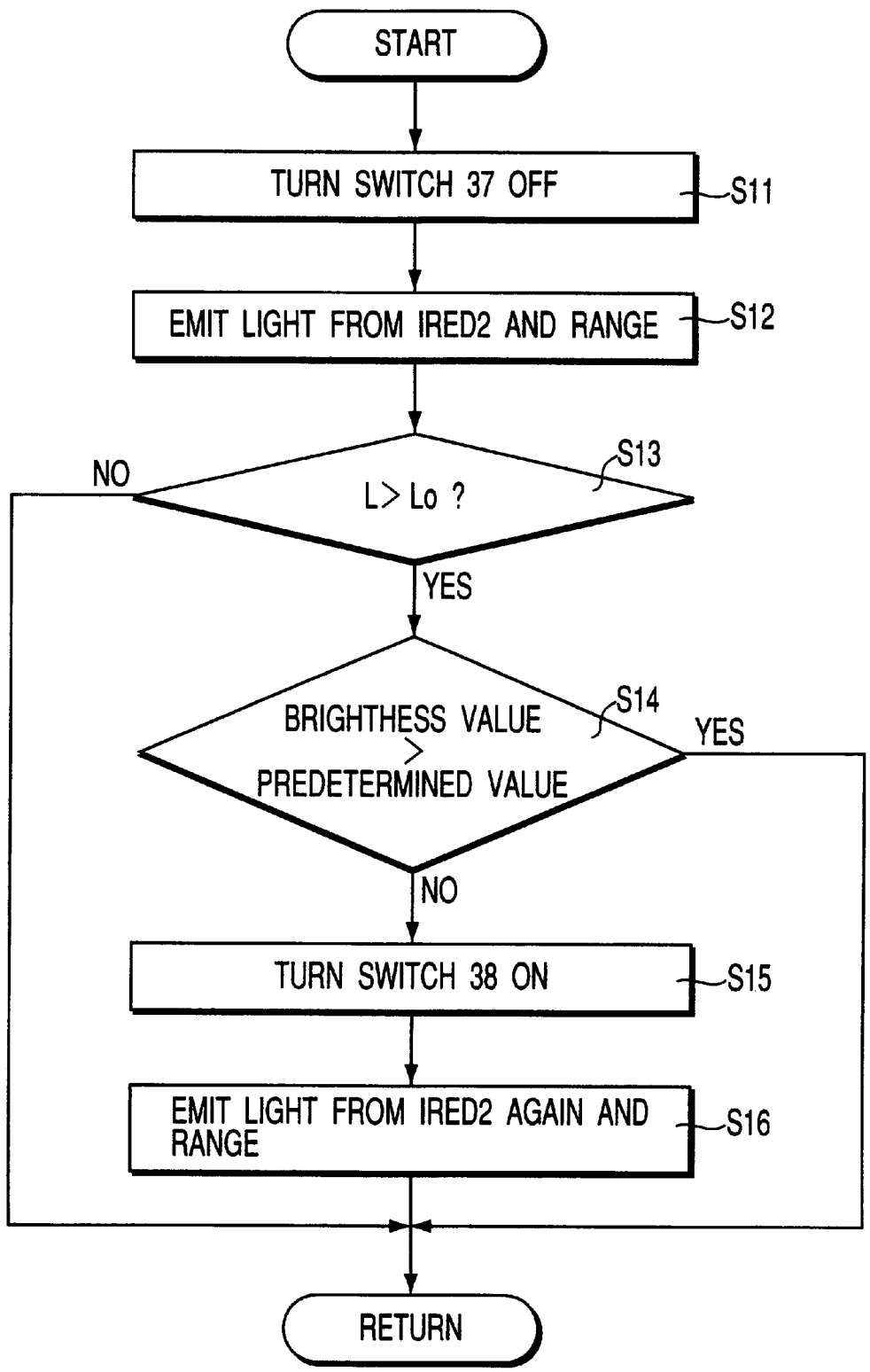

Further, with regard to the ON/OFF switching operation of the switch 38, it may be switched in accordance with the distance of the object or the brightness value of the object as can be seen in FIG. 9 in connection with the fourth embodiment. FIG. 10E is a flowchart illustrating such a procedure. Here, the steps involved in this chart are similar to those of FIG. 9 except for the step S15 where the switch SW38 is turned on, and therefore the explanation therefor will not be repeated.

Unlike the before-described embodiments, in this embodiment, there is no extruded portion from the PSD as described above; therefore the signal of the light projected can be efficiently converted photo-electrically. Consequently, it becomes possible to perform remote-distance ranging of a high S/N ratio and high accuracy.

In this embodiment, it is also required to perform ranging with the switching operation as shown in FIG. 6B; however there is no PD section to be separately provided. Consequently, the judgment of the brightness can be omitted.

Figure 11:
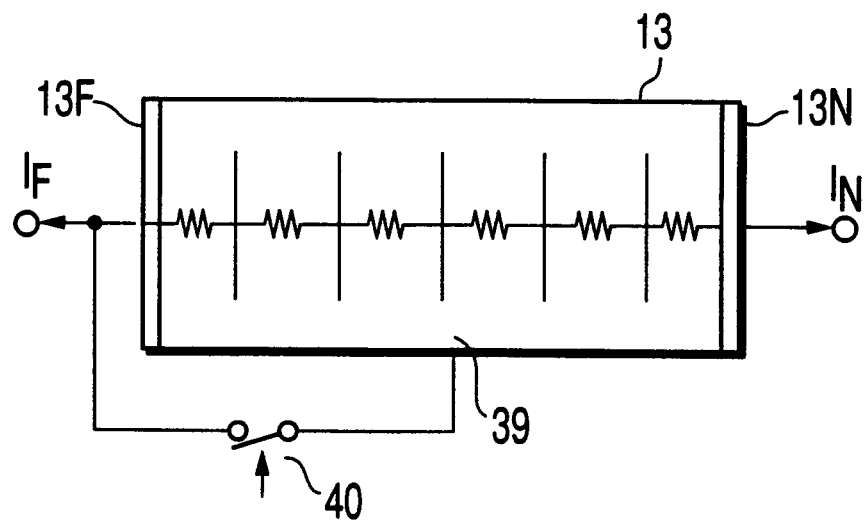
FIG. 11 is a diagram illustrating the structure of a position sensitive detector in the ranging device according to the sixth embodiment.

FIG. 11 shows the conceptual structure of the position sensitive detector in a ranging device according to the sixth embodiment, which will now be described.

In this embodiment, an auxiliary conductive layer 39 and a switch 40 are provided. Thus, when a reflection light spot is received from an objected located at a far distance further from a predetermined distance, a photo current of a near distance side is taken on an electrode 13F on the far distance side by means of the auxiliary conductive layer 39 via the switch 40.

With this structure, a signal current $I_N$ which appears originally on the near distance side is detoured onto the far distance side, and as a result, a signal current $I_F$ on the far distance side is emphasized.

Unlike the before-described embodiments, in this embodiment, not only simply the signal current on the far distance side is emphasized, but also at the same time, the signal current on the near distance side is reduced. Consequently, the distance resolution can be further improved.

Figure 12:
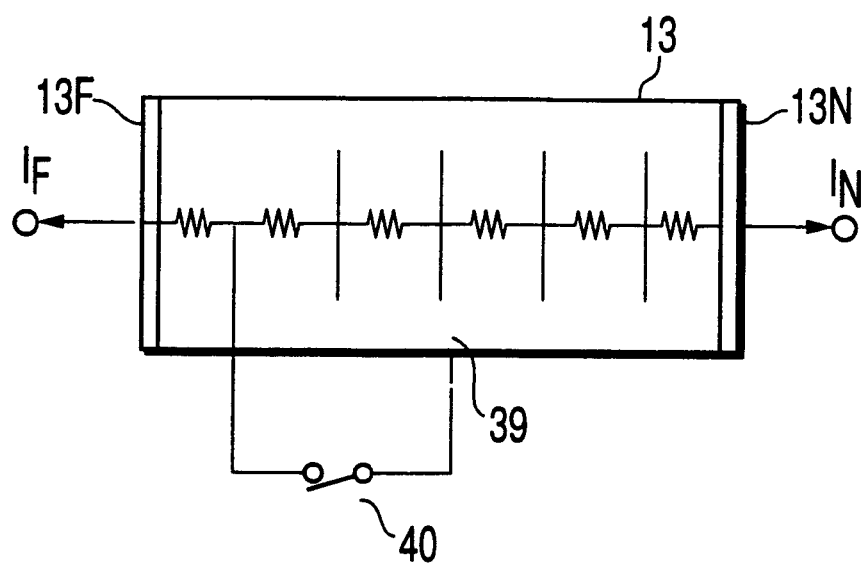
FIG. 12 is a diagram illustrating another version of the position sensitive detector according to the sixth embodiment.

FIG. 12 discloses a remodeled version of the sixth embodiment.

In the sixth embodiment described above, the switch 40 is provided in order to take the signal current $I_N$ onto the electrode 13F of the far distance side, whereas in this version, an electrode for taking such a current, is provided on a close side to the far distance side electrode 13F. The operation and effect are similar to those of the sixth embodiment.

As described above, with this embodiment, it becomes possible to provide a high-accuracy AF camera with a further improved resolution in the far distance ranging by the active AF, which is conventionally difficult to achieve, by varying the variance rate of the signal output.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A ranging device comprising:

a light projecting portion for projecting ranging light to an object to be photographed;

a light receiving portion for receiving reflection light of the ranging light from the object, and for outputting two signals for detecting an incident position thereof; and a superimposing portion for outputting a signal to be superimposed on one of the two output signals when the object is located at a further remote side than at a predetermined distance.

2. A ranging device according to claim 1, wherein said superimposing portion is made of a photo-diode.

3. A ranging device according to claim 1, wherein said superimposing portion is made of an electrode.

4. A ranging device according to claim 1, wherein said superimposing portion is made of a conductive layer.

5. A ranging device according to claim 2, wherein said photo-diode has a rectangular shape.

6. A ranging device according to claim 2, wherein said photo-diode has a triangular shape.

7. A ranging device according to claim 4, wherein said conductive layer has a rectangular shape.

8. A ranging device according to claim 4, wherein said conductive layer has a triangular shape.

9. A ranging device according to claim 1, wherein said superimposing portion and said light receiving portion are provided separately.

10. A ranging device according to claim 1, wherein said superimposing portion and said light receiving portion are provided as an integral body.

11. A ranging device comprising:

a light projecting portion for projecting ranging light to an object to be photographed;

a light receiving portion for receiving reflection light of the ranging light from the object, and detecting an incident position thereof, and for outputting a first signal and a second signal which is different from the first signal;

a first electrode portion, provided on one side of said light receiving portion, for outputting the first signal;

a second electrode portion, provided on another side of said light receiving portion, for outputting the second signal; and a superimposing portion, disposed between the first electrode portion and the second electrode portion towards the second electrode portion, for outputting a signal to be superimposed on the second signal when the incident position is located closer to the second electrode portion than a predetermined position.

12. A ranging device according to claim 11, wherein the signal superimposed by said superimposing portion increases as becoming closer towards the second electrode portion.

13. A ranging device according to claim 12, wherein the signal superimposed increases in a linear manner.

14. A ranging device according to claim 12, wherein said superimposing portion has a triangular shape.

15. A ranging device according to claim 14, wherein said superimposing portion having a rectangular shape is made of a photo-diode.

16. A ranging device according to claim 14, wherein said superimposing portion having a rectangular shape is made of a conductive layer.

17. A ranging device comprising:

a light projecting portion for projecting ranging light to an object to be photographed;

a light receiving portion for receiving reflection signal light of the ranging light from the object;

a first electrode portion for outputting a signal for a near distance side in accordance with an incident position and an intensity of the reflection light received by said light receiving portion;

a second electrode portion for outputting a signal for a far distance side in accordance with an incident position and an intensity of the reflection light received by said light receiving portion;

a superimposing portion for outputting a signal to be superimposed on the output signal for the far distance side; and a switching portion for electrically connecting or separating said light receiving portion and said superimposing portion to or from each other.

18. A ranging device according to claim 17, further comprising:

an object distance operation circuit for calculating a distance to the object on the basis of an output from said light receiving portion; and an object brightness value calculating circuit for calculating a brightness value of the object.

19. A ranging device according to claim 18, wherein said switch portion connects said light receiving portion and said superimposing portion to each other when the distance to the object calculated by said object distance operation circuit is at a predetermined value or more and when the object brightness value calculated by said object brightness value calculation circuit is at a predetermined value or less.

20. A ranging device according to claim 18, wherein said switch portion separates said light receiving portion and said superimposing portion from each other when the distance to the object calculated by said object distance operation circuit is at a predetermined value or less and when the object brightness value calculated by said object brightness value calculation circuit is at a predetermined value or more.

21. A ranging device according to claim 17, wherein said superimposing portion is a third electrode portion provided between the first electrode portion and the second electrode portion, and connected to the second electrode portion via said switch portion.

22. A ranging device according to claim 17, wherein a resistance layer which connects the first electrode portion and the second electrode portion together, and a conductive layer for guiding a photo-current to said resistance layer are provided in said light receiving portion.

23. A ranging device according to claim 22, wherein said superimposing portion is an auxiliary conductive layer provided as an auxiliary to the conductive layer of the first electrode portion side.

24. A ranging device comprising:
   a light projecting portion for projecting ranging light to an object to be photographed; and
   a light receiving portion for receiving reflection light of the ranging light from the object, and detecting an incident position thereof, and for outputting two signals on a far distance side and a near distance side;
   wherein the output signal on the far distance side is increased, or the output signal on the near distance side is decreased in accordance with a distance to the object.

25. A ranging device including a light receiving sensor for detecting a light incident position which depends on a distance to an object to be photographed, having:
   a first ranging mode for detecting a signal corresponding to a light incident position to an entire surface of said light receiving sensor; and
   a second ranging mode for detecting a signal depending on an intensity of light made incident at a predetermined position on said light receiving sensor.

26. A ranging device according to claim 25, further comprising an object brightness value calculation circuit for calculating a brightness value of the object.

27. A ranging device according to claim 26, wherein the first ranging mode and the second ranging mode are switched over in accordance with at least a calculated value by said object brightness value calculation circuit.

28. A ranging device comprising:
   a light projection portion for projecting ranging light to an object to be photographed;
   a light receiving portion for receiving reflection light of the ranging light from the object, and for outputting a photocurrent to be supplied to a plurality of electrodes; and
   a switch, provided for the light receiving portion, for changing distribution of the photocurrent supplied to the electrodes.

* * * * *